United States Patent [19]
Bolick, Jr.

[11] 3,953,685
[45] Apr. 27, 1976

[54] MULTIPLE-CHANNEL DICTATE STATION APPARATUS WITH AUTOMATIC RELEASE OF SELECTED CHANNEL

[75] Inventor: Fred C. Bolick, Jr., Atlanta, Ga.

[73] Assignee: Lanier Electronic Laboratories, Inc., Atlanta, Ga.

[22] Filed: Nov. 6, 1974

[21] Appl. No.: 521,208

[52] U.S. Cl. .................................. 179/100.1 DR
[51] Int. Cl.² .................. G11B 15/06; H04M 11/10
[58] Field of Search ............... 179/100.1 DR, 99; 200/5 E, 5 EA

[56] References Cited
UNITED STATES PATENTS

| | | | |
|---|---|---|---|
| 2,765,372 | 10/1956 | Peterson | 179/100.1 DR |
| 3,328,536 | 6/1967 | Bolick, Jr. | 179/100.1 DR |
| 3,333,069 | 7/1967 | Anderson | 200/5 E |
| 3,527,891 | 9/1970 | Johnston | 179/100.1 DR |
| 3,675,504 | 7/1972 | Schuh | 200/5 E |
| 3,705,961 | 12/1972 | Nye et al. | 179/100.1 DR |
| 3,706,858 | 12/1972 | Keitel | 179/100.1 DR |

*Primary Examiner*—Vincent P. Canney
*Attorney, Agent, or Firm*—Jones, Thomas & Askew

[57] ABSTRACT

Dictate station apparatus for use with a multiple number of remotely situated dictation recording machines. The dictate station apparatus is selectively manually switchable for connection with any of the recording machines, so that a dictated message can be transmitted to a selected recording machine from the dictate station. When a control member at the dictate station is operated by termination of desired message dictation, the previously actuated recorder switch is automatically released so that a manual selection of a recording machine must again be made before a subsequent dictation operation can be initiated. Release of a previously actuated recorder selection switch may be accomplished in response to hang-up of a hook switch associated with the dictate station.

11 Claims, 3 Drawing Figures

MULTIPLE-CHANNEL DICTATE STATION APPARATUS WITH AUTOMATIC RELEASE OF SELECTED CHANNEL

This invention relates in general to dictation recording apparatus and in particular to a dictate station for use with remotely situated recording apparatus.

Dictation recording and transcription systems may be generally divided into two types of systems. The first type of system, which may be designated the local-equipment system, includes a separate dictation recording or transcribing apparatus located at each dictating location or transcribing location. The second type of dictation system, sometimes known as a "central dictation system" typically consists of one or more dictation recorder or recorder-transcriber units which may be remotely situated from the dictation location and the transcription location. Each central dictation recorder is connected by wiring to one or more dictate stations which are typically at desks or other dictation locations, so that the dictate stations are operatively interconnected with the central dictation recorder apparatus to record dictated messages thereon. The design and operation of central dictation systems and equipment are known to those skilled in the art.

Central dictation systems provide a number of operational advantages over conventional dictation equipment, and such central dictation systems frequently are used in installations including several separate central dictation recorders and a number of separate dictate stations. Depending on the nature and frequency of dictation encountered in a particular installation, it may be advantageous to provide a number of dictate stations exceeding the number of central dictation recorders, along with appropriate switching to allow each dictate station to be selectively connected to any one of several or all of the central recorders. A person desiring to dictate a message from a particular dictate station in a central dictation system of this type will be required to establish interconnection between his dictate station and one of the central recorders which is not already receiving a dictated message from another dictate station.

Several types of switching arrangements have been proposed for use with central dictation systems employing plural numbers of dictate stations and of central recorders. The most simple switching arrangement consists of a multiple-position selector switch which may be installed adjacent each individual dictate station, and which contains switch contacts connected by wire to a corresponding number of separate central dictation recorders. The person using this dictate station selects a particular switch position corresponding to a desired central dictation recorder, and then engages the selected recorder by raising the hook switch of his dictate station. Those skilled in the art will recognize that central dictation recorders generate a "busy" signal condition when in use, and that dictate stations connected to an in-use central dictation recorder are rendered inoperative in response to a busy signal received from a selected central recorder. This inoperativeness of a dictate station, in response to a busy signal from an unavailable central recorder, prevents connection with a recorder which is already connected with another dictate station, or which is not of service. The person desiring connection with a central recorder would, in such case, select another central recorder channel by manipulating the selector switch. The use of a selector switch, while providing mechanical simplicity, has the practical result that the selector switch remains set at a particular switch position through operator inattention, so that most or all of the dictation originating from a particular dictate station tends to be directed only to one central recorder. While such a result may be desirable in some instances, it is frequently preferable that each person be required to direct his dictated messages to a particular predetermined central recorder. It may, alternatively, be desired to direct certain types of dictated messages to certain specific central recorders.

Alternative types of dictate stations have been proposed for preferential selection of central recorders, or for providing completely automatic selection of the next-available central recorder in a rotating sequence of preference. Such dictate stations and equipment tend to require complex and frequently troublesome equipment, however, and has not found widespread commercial accpetance.

It is, accordingly, an object of the present invention to provide an improved dictate station for use with central dictation systems.

It is another object of the present invention to provide an improved dictate station for use in central dictation systems which have a plural number of dictation message recording channels.

It is still another object of the present invention to provide a multiple-channel dictate station which allows selection of any available message receiving channel and which automatically relinquishes a selected channel upon termination of message dictation.

Other objects and advantages of the present invention will become more readily apparent from the disclosed preferred embodiments of the present invention as set forth in the disclosure including the drawing in which.

Stated in general terms, the present invention comprises a multiple-circuit control apparatus having a circuit utilization means, a plural number of central recorder lines for separate selective connection with the circuit utilization means, and a corresponding plural number of separately and selectively actuatable switches which may be operated to connect a particular central recorder line to the circuit utilization means. A selected switch, when engaged, is latched into the actuated position to maintain circuit interconnection between the utilization means and the central recorder line associated with the particular switch. The circuit utilization means includes an operation control means which is operatively interconnected with the switch latching means, so that the selected switch becomes unlatched in response to termination of the circuit utilization means. Stated somewhat more specifically, the circuit utilization means can constitute the audio and control circuitry of a conventional dictate station, and the switch latching mechanism can be actuated in response to a hang-up condition of a hook switch associated with the dictate station.

Figure 1:
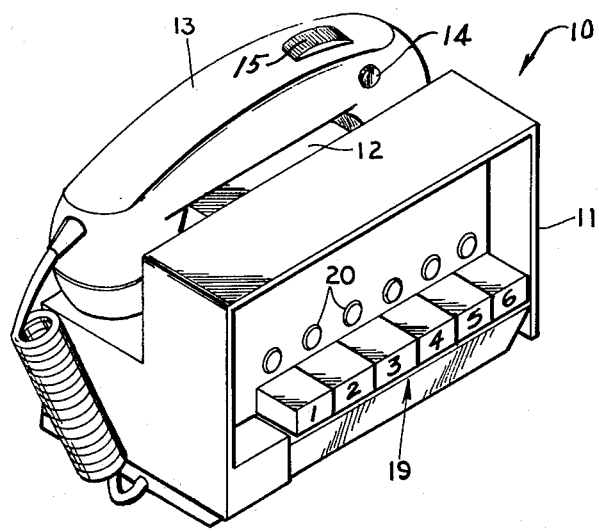
FIG. 1 shows a pictorial view of a dictate station according to a disclosed embodiment of the present invention.

The present invention is more specifically explained with reference to the disclosed embodiment of a multiple-channel dictate station shown generally at 10 in FIG. 1 and including a housing 11 having a cradle 12 on which is received a telephone-type handset 13. The handset 13 is provided with appropriate dictation controls, such as the dictate switch 14 and the reverse-listen slide switch 15 known to those skilled in the art. The handset-receiving cradle 12 includes a hook switch (not shown in FIG. 1) which is actuated by the presence or absence of the handset 13 on the cradle. The dictate station is said to be "off-hook" when the handset 13 is removed from the cradle 12, whereupon the hook switch assumes a switching state which controls desired interconnection with a remotely situated dictation recorder. When the handset 13 is returned to the cradle 12, the hook switch is returned to an "on-hook" switching condition denoting the termination of a previously-connected dictation operation. The electronic components and electrical interconnections between a prior-art dictate station and a typical central dictation recording apparatus are found, for example, in U.S. Pat. No. 3,671,680, which is assigned to the assignee of the present invention.

The dictate station 10 of the disclosed embodiment is provided with six dictate channel selector switches SW-1 . . . SW-6 (FIG. 2), with each selector switch having a correspondingly-numbered control button on the housing 11 as collectively indicated at 19 in FIG. 1. Separate signal lamps 20 may be positioned on the housing 11 in physical correlation with each corresponding control button 19. It will be understood by those skilled in the art that the choice of six channel selector switches is merely by way of example, and that a greater or lesser number of channel selector switches can be provided in a dictate station according to the present invention.

Figure 2:
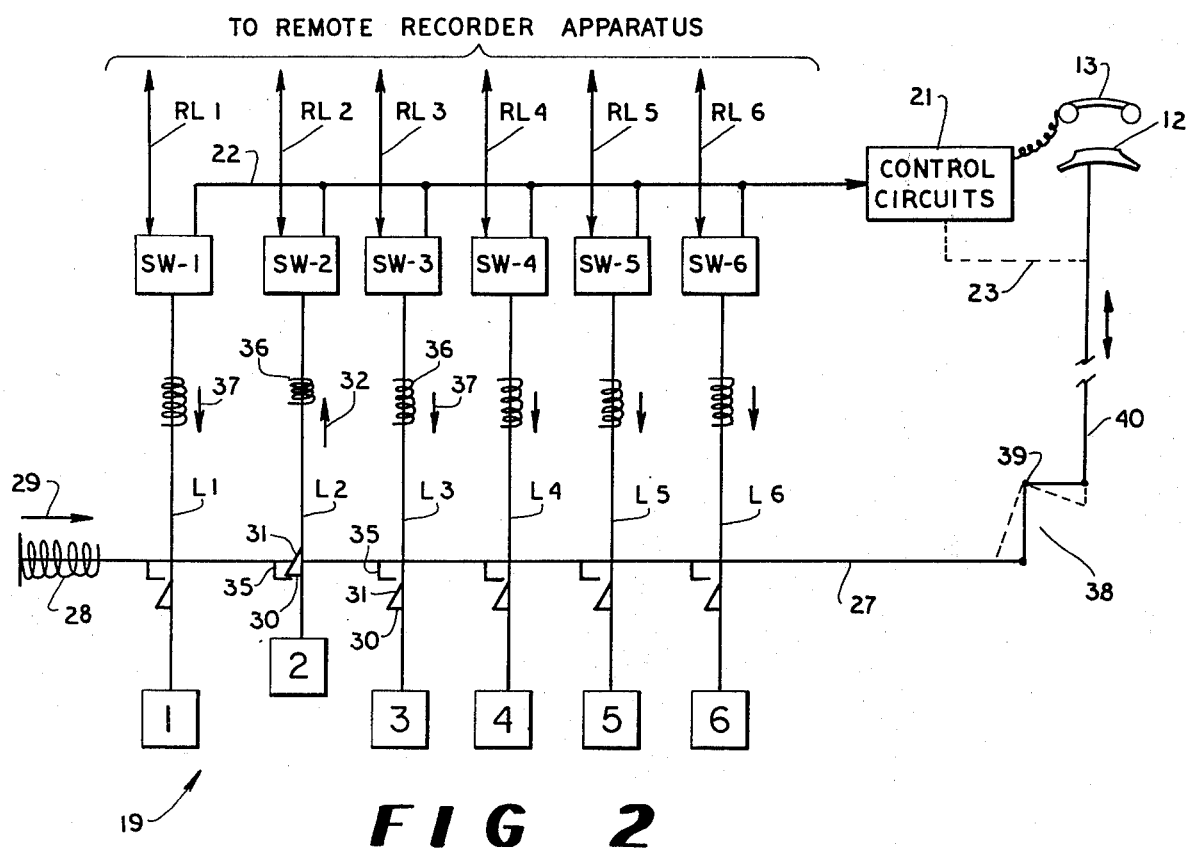
FIG. 2 shows a particularly-schematic view of channel selection and release apparatus according to a disclosed embodiment of the present invention.

Turning to FIG. 2, it is seen that each of the control buttons 19 is connected by a connecting link L1, L1. . .L6 to the correspondingly-numbered selector switches SW. Each of the selector switches SW is shown in block form in FIG. 2, and may advantageously consist of a conventional push-engage pull-disengage switch having a number of poles corresponding to the number of conductors in the circuit to be switched. Each of the selector switches SW is connected to a corresponding remotely located recorder apparatus by separate recorder lines RL1. . .RL6. Those skilled in the art will realize that each of the recorder lines RL, in a typical example of conventional central dictation apparatus, consists of four separate conductors along which both audio signals and control signal conditions are exchanged between the remotely located recorder apparatus and the conventional control circuit apparatus 21 of the dictate station. Each of the switches SW, when engaged, establishes a circuit interconnection between the corresponding recorder line RL and the control line 22 extending to the control circuit apparatus 21. It will thus be understood, for example, that when selector switch SW-2 is engaged by depressing the correspondingly numbered control button, a four-wire circuit interconnection is established from the control circuit apparatus 21 through selector switch SW-2 at the recorder line RL2 to a remotely located recorder apparatus. After such selection is accomplished, raising the handset 13 from the cradle 12 causes the hook switch associated with the control circuit apparatus 21 to be operated by the operative interconnection indicated at 23, whereupon the selected recorder apparatus channel (if available to receive dictation) is seized by the dictate station and may now be operated for message dictation by manipulating the controls 14 and 15.

Extending transversely of the connecting links 1 is a latching bar 27 which is normally urged by the spring 28 in the direction shown by the arrow 29. Each of the connecting links 1 contains a latching member 30 having a sloping ramp surface 31 which faces in the direction of selector switch engagement motion, as indicated by the arrow 32. The latching bar 27 carries a plural number of latch engagement members 35 adjacent the location of intersection with each of the connecting links L1, L2. . .L6. It is apparent from FIG. 2 that each of the latch engagement members 35, upon movement of the corresponding connecting links L in the direction 32, is contacted by the ramp surface 31 of the latching member 30 associated with the connecting link. Each of the connecting links L is provided with a resilient device such as the springs 36 which normally urge the connecting links in the direction of the selector switch disengagement shown by the several arrows 37.

When a particular control button 19 is depressed to move a connecting link L2, for example, in the selector switch actuation direction 32, the corresponding latch engagement member 35 and the latching bar 27 are translated leftwardly (as seen in FIG. 2) as the latch engagement member 35 slides along the ramp surface 31. When the connecting link L2 is in its fully-depressed position corresponding to actuation of the selector switch SW-2, the latch engagement member has moved beyond the end of the ramp surface 31 so that the latching bar 27 and the latch engagement member 35 are returned by the spring 28 to a position which latches the latching member 31 and the connecting link L2 in the switch actuating position.

The end of the latching bar 27 remotely situated from the spring 28 is pivotally connected to a linkage 38 which is mounted for rotation about a pivot 39 and which is mechanically interconnected by the link 40 for movement by the cradle 12 of the dictate station. It will be understood that the cradle 12 is maintained in an elevated position by the force of the spring 28, so long as the handset 13 remains off-hook. When the handset 13 is returned to the cradle 12 and thus becomes on-hook, however, the weight of the handset 13 forces the link 40 downwardly and the linkage 38 moves to the broken-line position to translate the latching bar 27 leftwardly against the force of the spring 28. The latch engagement member 35 is thus moved out of latching engagement with the latching member 30, and the connecting link L2 is returned by the spring 36 to a position which de-actuates the previously actuated selector switch SW-2.

Reviewing the operation of the dictate station embodiment shown in FIG. 2 and described thus far, a person desiring to dictate a message removes the handset 13 from the cradle 12 and then depresses a desired one of the control buttons 19 to obtain possible operational interconnection with a corresponding remotely located recorder apparatus. The signal lamps 20, if provided, are interconnected with the recorder lines RL in a manner known to those skilled in the art to provide a "busy light" which is illuminated when the corresponding recorder apparatus is already in use, so that a person is advised to select another recorder apparatus. When a particular selector switch SW is actuated and latched by the latching member 30 and the latch engagement member 35, the selected recorder apparatus is seized by the control circuit apparatus 21 and message dictation can follow in the conventional manner. When the handset 13 is subsequently returned to the cradle 12, the previously actuated selector switch SW is released as described above and the latching bar 27 is maintained in a nonlatching position so that it is impossible for the on-hook dictation station to remain potentially interconnected with a particular recorder apparatus. The next person using the dictate station must, accordingly, make an affirmative selection of a particular dictate station before commencing his dictation; he cannot inadvertently be connected to a previously used recording apparatus merely be removing the handset from the cradle and attampting to dictate a message.

Figure 3:
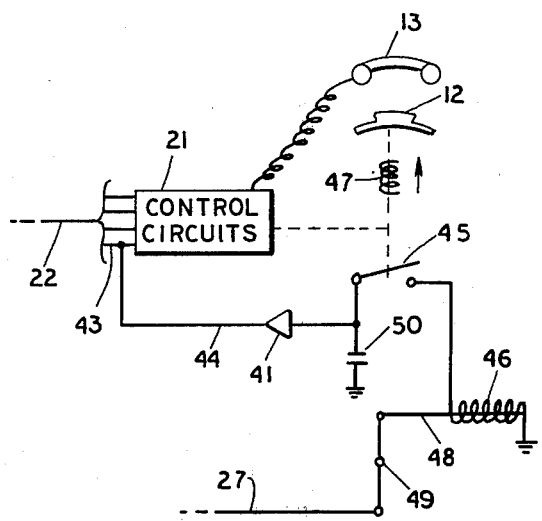
FIG. 3 shows a partial view of another disclosed embodiment, including alternate channel selection release apparatus.

An alternative embodiment of the present invention, as depicted in FIG. 3, utilizes an electromechanical device to accomplish disconnection of a previously actuated selector switch. It will be understood that FIG. 3 depicts only those portions of the dictate station which differ from the embodiment shown in FIG. 2. The control line 22 extending from the several selector switches SW is expanded in FIG. 3 to illustrate a four-conductor line including a conductor 43 which is connected by the line 44 through a diode 41 and across a capacitance 50 to a normally open switch 45 and a selenoid coil 46. The switch 45 is mechanically interconnected to the cradle 12, and a suitable spring 47 maintains the cradle 12 in an elevated position only so long as the handset 13 remains in the off-hook position depicted in FIG. 3. The operating plunger 48 of the selenoid 46 is connected to the latching bar 27 through a linkage which pivots about the point 49.

Considering the operation of the embodiment shown in FIG. 3, it is assumed that the handset 13 is off-hook and that a remotely located recorder apparatus has been interconnected with the control circuit apparatus 21 through actuation of a suitable selector switch SW. The conductor 43, which was interconnected with the selected recorder apparatus, receives a predetermined voltage condition in response to seizure of the selected recorder apparatus; central dictation recorders of the prior art typically emit a seizure control voltage of approximately −24 volts, when seized for dictation. This seizure signal is applied on the line 44 to charge the capacitance 50, with the switch 45 in its open position. When the handset 13 is returned to the cradle 12, the switch 45 becomes closed and the voltage present on the conductor 43 is applied to energize the solenoid 46 and to move the latching bar 27 in a direction which unlatches the connecting link L of the previously selected switch SW. Since the seizure voltage on the conductor 43 will disappear as soon as the dictate station becomes on-hook, it may be necessary to provide the capacitance 50 for the purpose of momentarily actuating the solenoid 46 when the switch 45 becomes closed. The capacitance 50 may be unnecessary, however, in applications where the seizure voltage remains on the conductor 43 for a sufficient time to energize the solenoid 46 for disengaging movement of the latching bar 27, or in applications where at least one of the conductors associated with the control line 22 contains a voltage sufficient to actuate the solenoid 46 irrespective of the on-hook status of the dictate station. As soon as the previously actuated selector switch SW is released, of course, the control line 22 is disconnected from any recorder apparatus. The diode 41 prevents the capacitance 50 from discharging through the conductor 43, which may be at ground potential when the seizure voltage disappears from the conductor 43.

The embodiment shown in FIG. 3 may, if desired, be modified to require the positive actuation of a solenoid for maintaining the latching bar 27 in switch-latching operation, so that operating voltage is removed from the solenoid only when the dictate station becomes on-hook. Such a modification would prevent premature selection and latching engagement of a selector switch while the dictate station remains on-hook, a possibility which exists in the embodiment of FIG. 3.

Referring again to FIG. 2, it will be understood that selection of another selector switch following initial selection and actuation of a first selector switch will cause the previously selected switch to become disengaged. This previous-switch disengagement is provided by movement of the latching bar 27 in the leftward direction by the interaction of the ramp surface 31 and the latch engagement member 35. It will be seen, accordingly, that the present dictate station cannot be operated in a manner which simultaneously connects more than one recorder apparatus with the dictate station.

It will be understood that the foregoing relates only to disclosed embodiments of the present invention, and that numerous alterations and modifications may be made therein without departing from the spirit and the scope of the invention as defined in the claims which follow.

What is claimed is:

1. Multiple line control apparatus for selective interconnection with any one of plural available circuits, comprising:
    a circuit utilization means which is selectively operable;
    a plural number of separately selectively actuatable switch means each of which is operative to connect a corresponding input circuit to said circuit utilization means;
    disconnect means operatively associated with each of said switch means to disconnect any previously-actuated one of said switch means in response to actuation of another one of the switch means, so that selection of a particular said circuit causes any previously-selected circuit to be relinquished;
    means operative to maintain said selected switch means in said actuated state during selected operation of said utilization means; and
    means responsive to termination of said operation of said utilization means to release said maintaining means from actuation maintaining operation independently of said operation of said disconnect means.

2. Apparatus as in claim 1, wherein:
    said utilization means comprises a control means which is moved from a first position to a second position to initiate a dictation operation and which is returned to said first position to terminate said dictation operation; and
    said termination responsive means is operatively associated with said control means to release said maintaining means in response to return of said control means to said first position.

3. Apparatus as in claim 2, wherein said release means includes a mechanical linkage connected to said control means and operative to release said maintaining means in response to return of said control means to said first position.

4. Apparatus as in claim 2, wherein said release means comprises a solenoid operatively associated with said maintaining means to selectively release said maintaining operation, and switch means operated by return of said control means to said first position to operatively control said solenoid for said selective release.

5. Dictate station apparatus for selective operative interconnection with any of plural dictation receiving circuits, comprising:
   dictation control means for operative connection with any selected one of several dictation receiving circuits;
   said dictation control means including a control element which is placed in a first state to initiate a dictate operation and is placed in a second state to terminate the previously initiated dictate operation;
   a plural number of separate selectively actuatable switch means each of which is operative upon actuation to establish operative circuit interconnection between said dictation control means and a separate one of said dictation receiving circuits;
   holding means operatively associated with each said switch means to maintain a selected switch means in said actuated state;
   disconnect means operatively associated with each of said switch means to disconnect any previously actuated one of said switch means in response to actuation of another one of the switch means, so that selection of a particular said dictation receiving circuit causes any previously selected dictation receiving circuit to be relinquished; and
   release means operatively connected to said holding means and responsive to the state of said control element to release said selected switch means in response to placement of said control element in said second state independently of operation of said disconnect means.

6. Apparatus as in claim 5, wherein:
   said holding means includes mechanical latching means operative to engage and retain a selected switch means in said actuated state;
   said control element includes a movable member which is selectively positionable at first and second positions to provide said corresponding first and second states; and
   said release means includes a mechanical interconnection operatively disposed between said movable member and said latching means to withdraw said latching means from latching engagement with said selected switch means when said movable member is moved to said second position.

7. Apparatus as in claim 5, wherein:
   said holding means includes mechanical latching means operative to engage and retain a selected switch means in said actuated state;
   said control element includes switch means operative to assume a control switching state when in said second state; and
   said release means includes solenoid means operatively associated with said switch means and connected to withdraw said latching means from latching engagement with said selected switch means in response to said switch means assuming said control switching state.

8. Apparatus as in claim 6, wherein:
   said movable member comprises a hook switch which is selectively movable to an off-hook position corresponding to said first position, and to an on-hook position corresponding to said second position.

9. Apparatus as in claim 7, wherein:
   said control switching means comprises a hook switch means which is selectively movable to an off-hook position to initiate the dictate operation and to an on-hook position to terminate the dictate operation;
   said hook switch means when in said off-hook position being operatively associated with said solenoid means to maintain said latching engagement of said latching means, and when in said on-hook position being operatively associated with said solenoid means to withdraw said latching means from said latching engagement.

10. Dictate station apparatus as in claim 5, wherein:
    each of said switch means comprises a member which is manually movable to an operative position, and circuit switching means which is mechanically operated by said member and which interconnects said dictation control means and a respective one of said dictation receiving circuits when said member is in said operative position;
    said holding means comprises a latch operative to hold each said switch member in said operative position; and
    said release means comprises a mechanical interconnection between said latch means and said control element of said dictation control means to release said latch means and allow any previously held one of said switch members to be released when said control element is placed in said second state.

11. Apparatus as in claim 10, wherein said control element comprises the hook switch of the dictate station.

* * * * *